INVENTOR.
FRANCIS E. DEPAUW

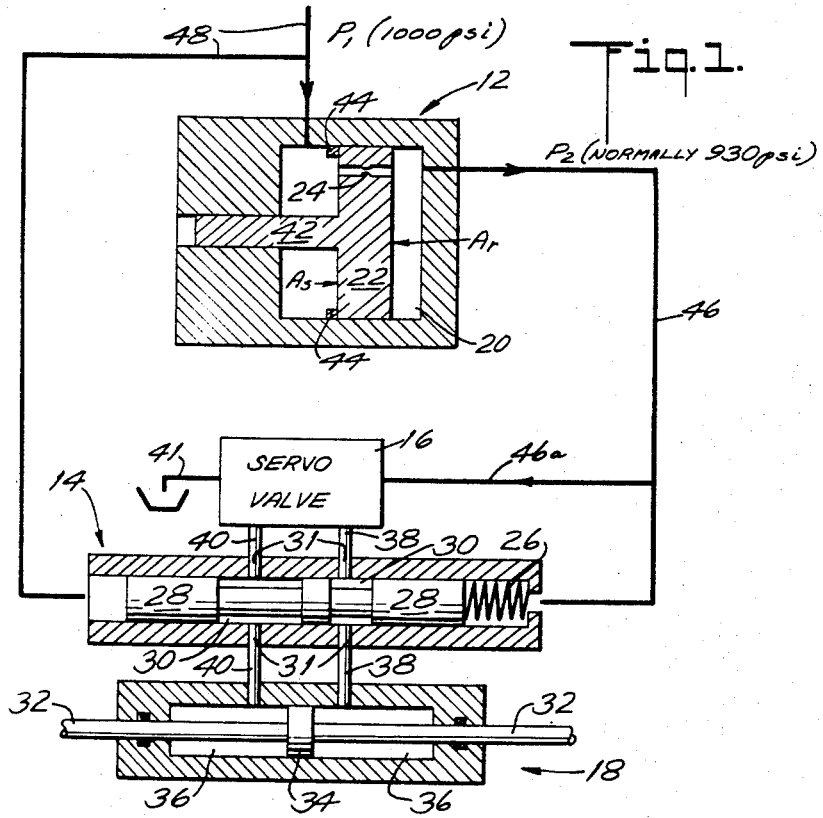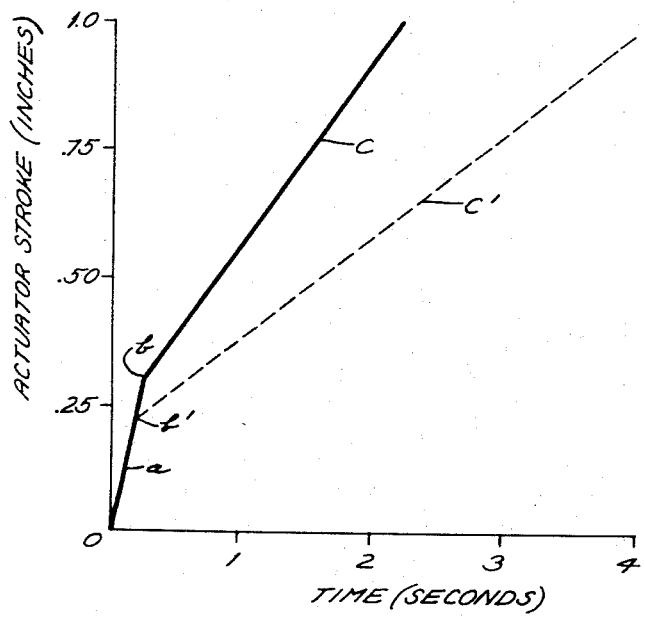

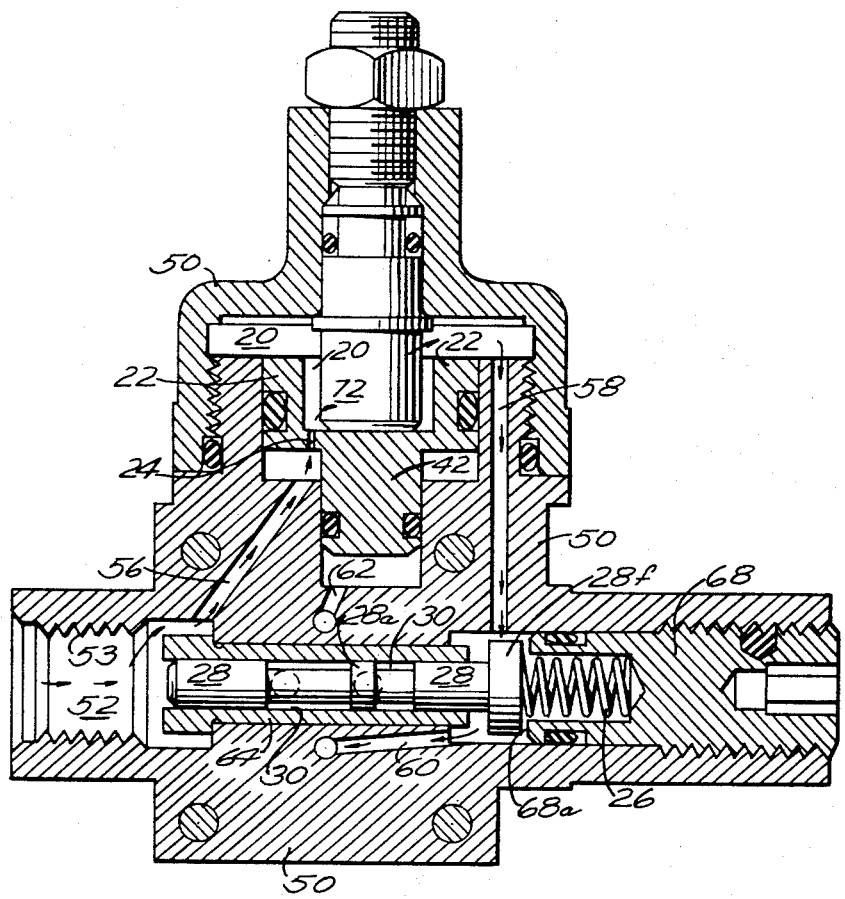

United States Patent Office 3,420,265
Patented Jan. 7, 1969

3,420,265
HYDRAULIC FLOW LIMITING DEVICE
Francis E. De Pauw, Fort Worth, Tex., assignor to Bell Aerospace Corporation, Wheatfield, N.Y., a corporation of Delaware
Filed Jan. 13, 1967, Ser. No. 609,104
U.S. Cl. 137—501
Int. Cl. F15b *11/02;* F16k *31/143*
5 Claims

ABSTRACT OF THE DISCLOSURE

The following application discloses a two stage hydraulic device that responds to excessive fluid flow demands by a hydraulic servo-valve in order to reduce the fluid flow output of the servo-valve. The servo-valve output is typically applied to a hydraulic actuator. This two-stage hydraulic device is a safety device which after a short time delay causes the stroke of the actuator in response to excessive fluid flow from the servo-valve to be slowed down. The first stage of this hydraulic velocity limiter safety device includes a floating differential piston in a chamber with a restrictor through the piston so as to provide a pressure drop across the piston. Fluid to the servo-valve first passes through this chamber and through the restrictor in the piston. When fluid flow increases substantially the drop across the restrictor increases and the piston is caused to move through the chamber to push an additional quantity of fluid into the servo-valve thereby maintaining pressure until the piston bottoms out. Once the piston bottoms out the pressure drop across the restrictor increases and becomes sufficiently great to actuate a valve in the second stage. The valve imposes a restriction in the fluid flow path between servo-valve and actuator. In this fashion, after the time delay caused by the piston moving from retracted to bottomed out position, the rate of fluid flow from the servo-valve to the actuator is reduced, thereby reducing the velocity of the stroke of the actuator.

---

This invention relates in general to a safety device in hydraulic systems and more particularly to a safety device for limiting the authority of an actuator when a malfunction in the servo-valve that controls the actuator causes a greatly increased fluid flow from the servo-valve to the actuator.

The problem to which this invention is specifically addressed arises in connection with automatic flight control systems aboard aircraft. In these systems, a hydraulically run actuator is employed to control the position of aerodynamic elements; for example, the pitch in the blades of a helicopter. There are malfunctions that occur which cause the actuator to slam over to one extreme position thus throwing the flight element into an extreme position or condition and thereby throwing the aircraft out of control.

Accordingly, the major purpose of this invention is to provide a safety device which will respond to sudden increases in fluid flow by limiting the response of the actuator to the increased fluid flow.

More specifically, it is an object of this invention to provide a device that will control or, more explicitly, limit, the velocity at which a hydraulic actuator operates in a hydraulic control system.

There are situations in which it is desirable to have the actuator initially respond at full velocity to sudden changes in fluid flow and to have the limiting action on actuator velocity occur only after a predetermined portion of the actuator stroke has been employed.

For example, when the safety device of this invention is employed in an automatic flight control system, it is desirable that the pilot be alerted to the malfunction. If the aircraft suddenly veers out of control by a small amount, the pilot will be given a jolt that tells him something is wrong and that will alert him to the necessity of manually taking over the controls. In such a case it is desirable that the limiter not operate until a short predetermined time period has elapsed. After that predetermined time period has elapsed, the limiter action reduces the velocity of the stroke of the actuator and thus reduces the rate at which the aircraft tends to go out of control. By thus reducing the authority of the actuator, the pilot is given time to respond to the jolt he has received and to take over the controls manually.

Accordingly, it is a further object of this invention to provide an actuator velocity limiter which will respond to malfunctions only after a predetermined period of time has elapsed.

It is a further object of this invention to provide a limiter design which will not require redesign of other components of the hydraulic system so that the limiter can be employed with presently known servo-valves and actuators.

It is a further and related object of this invention to provide a limiter design which will permit retrofit so that the safety feature can be incorporated in automatic flight control equipment presently used aboard aircraft.

In brief, this invention is a device which may be called a "hydraulic actuator velocity limiter" in that it is primarily intended to be used to limit the velocity of the actuating mechanism in a hydraulic actuator. The limiter device of this invention is placed in the fluid lines between a servo-valve and an actuator. When there is a sudden increase in fluid flow from the servo-valve, the limiter responds after a short time delay by restricting the fluid line between servo-valve and actuator. This restriction reduces the rate at which fluid flows to the actuator and thus reduces the velocity of the actuator stroke.

The limiter is a two stage hydraulic device. The first stage is connected into the input line to the servo-valve and provides a restricted path through the first stage of the limiter for fluid input to the servo-valve. Thus the input to the first stage is line pressure of, for example, 1,000 p.s.i. Due to the restrictor in the first stage, the output of the first stage under normal flow conditions to the servo-valve is somewhat less than 1,000 p.s.i. input pressures. For example, the output pressure may be 930 p.s.i. The restrictor in the first stage is located in a normally retracted floating differential piston. When the flow to the servo-valve increases past a certain point then the drop across the resistor becomes sufficiently great (for example, 140 p.s.i. drop) so that the piston is caused to advance within a fluid chamber in the first stage of the limiter. The point at which the piston starts to advance thus would be, for example, where the first stage output pressure is 860 p.s.i. As long as the piston advances the piston will force sufficient fluid into the output from the first stage so as to maintain the pressure of the fluid flow into the servo-valve at approximately 860 p.s.i. Once the piston has bottomed out, the increased fluid flow through the restrictor will cause the pressure to drop still further.

The second stage of the limiter normally provides an unrestricted path between the servo-valve and the hydraulic actuator being controlled by the output of the servo-valve. Within this second stage there is positioned a spring biased movable spool having a land portion such that when the spool is moved against the spring the land will cover part of the port openings through which fluid flows from servo-valve to actuator.

The spool is normally in a position such that there is no overlap between land and port so that there is normally no restriction in the line between servo-valve and actuator. The spool is kept in this normal position by the addition of the force exerted on the spool by a compression spring (which force, for example, might be 400 p.s.i.) and the hydraulic pressure from the output of the second stage. Thus under normal operating conditions the force on the spring side of the spool might be 1,330 p.s.i. The other side of the spool is hydraulically coupled to the input line pressure of 1,000 p.s.i. which, obviously, is not enough to overcome the normal 1,330 p.s.i. on the spring biased side of the spool.

However, when increased fluid flow through the first stage of the limiter has caused the floating differential piston to bottom out, the pressure at the output of the first stage will continue to drop. If this excessive fluid flow is sufficiently great so as to cause pressure at the output of the first stage to drop to 600 p.s.i. or less then the spool will become unbalanced and will move against the spring. This will move the land carried by the spool so that it will restrict the ports conducting fluid through the second stage of the limiter from servo-valve to actuator. The spool in this state thereby restricts flow to the actuator and thus slows down the stroke of the actuator.

The fact that the piston in the first stage of the actuator takes a period of time to travel from its normally retracted position to its bottomed out position provides the time delay between the initial demand for excessive fluid by the servo-valve and the motion of the spool in the second stage of the limiter that slows down the stroke of the actuator.

Other objects and advantages of the invention will become more apparent from the following description and appended claims taken in conjunction with the accompanying drawings in which:

FIG. 1 is a schematic illustration of this velocity limiter invention connected into a hydraulic system and showing the relationship between the limiter of this invention and the servo-valve and actuator combination with which it is particularly adapted to be used;

FIG. 2 graphically illustrates actuator displacement as a function of time (and thus illustrates actuator velocity) when fluid flow increases sufficiently to bring the limiter of this invention into play;

FIG. 4 is a cross-sectional view similar to FIG. 3 showing the differential piston in the fully advanced (bottomed out) position and the spool in the position where the second stage passage of fluid through the limiter is restricted.

Figure 3:
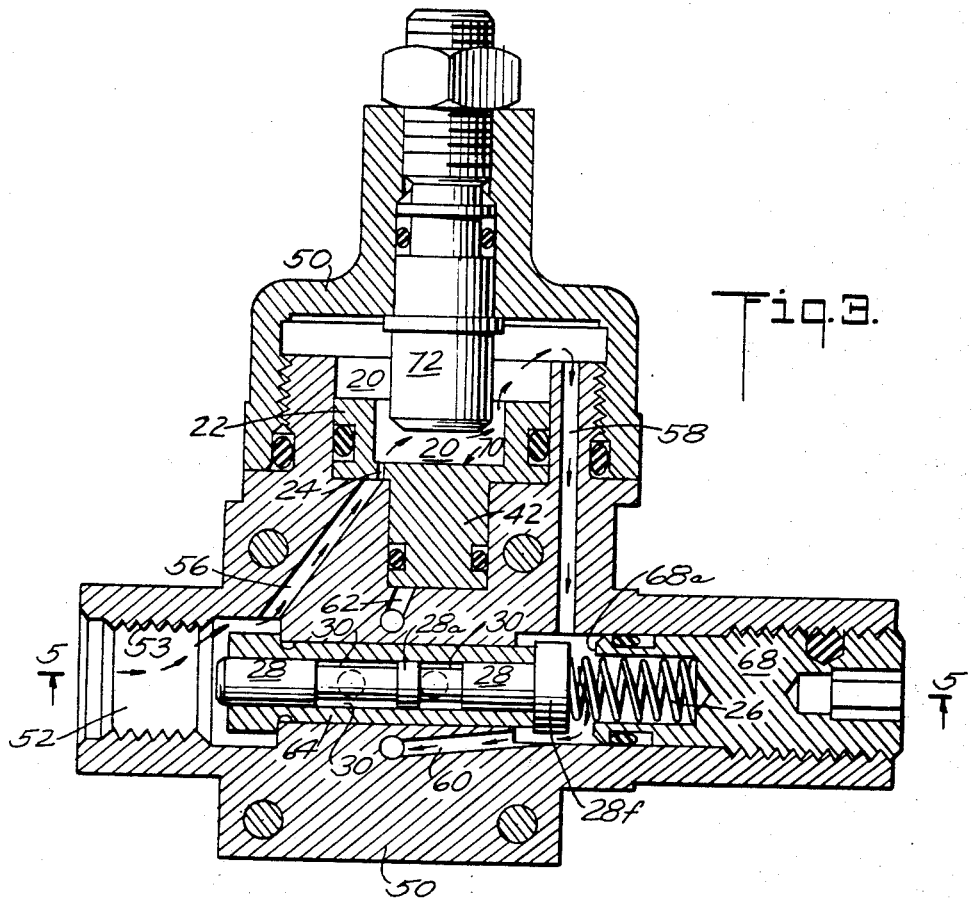
FIG. 3 is a longitudinal cross-section through one embodiment of the limiter of this invention with the differential piston shown in the normally retracted position.

FIG. 1 provides a simplified schematic illustration of the operation of this invention. In FIG. 1, the two stages of the limiter are shown separately as a first stage 12 and a second stage 14. A servo-valve 16 is hydraulically connected to an actuator 18. The servo-valve 16 determines the rate and direction of fluid flow to the actuator 18. A typical servo-valve 16 which may be employed in connection with the velocity limiter of this invention is illustrated in fig. 3.3, at page 45, of the book Electrohydraulic Servomechanisms by Allen C. Morse, copyright 1963 by the McGraw-Hill Book Company (Library of Congress Catalog #63–15024).

The first stage 12 of the limiter has a chamber 20 in which is slidably mounted a piston head 22. A passage having a restrictor 24 permits communication through the piston head 22. The second stage 14 of the limiter of this invention contains a spring 26 biased spool 28 having annular recesses 30. The spool 28 is normally positioned with the annular recesses 30 adjacent the ports 31 so as to permit fluid flow from the servo-valve 16 through the second stage 14 of the limiter to the actuator 18.

A simple form of actuator 18 is shown. It comprises an actuator rod 32 connected to a piston head 34 which piston head 34 is mounted for reciprocal movement in the chamber 36. The chamber 36 is normally filled with fluid on both sides of the piston head 34. When the servo-valve 16 forces fluid through the line 38 into the chamber 36, the actuator rod 32 and piston head 34 move to the left forcing fluid up the line 40 into the servo-valve 16 and out the return line 41. Reverse movement of fluid in the lines 38 and 40 forces the actuator rod 32 to move to the right.

Fluid at an input pressure $P_1$ (for example 1,000 p.s.i.) is applied to the first stage 12. Even during conditions where there is no fluid flow to or from the actuator 18, there is a normal flow of fluid through the servo-valve 16. This means that there is a normal flow of fluid through the restrictor 24 in the piston head 22 and consequently a pressure drop across the restrictor 24. This pressure drop is represented by the fact that the pressure $P_2$ at the output of the first stage 12 is shown as, for example, 930 p.s.i. For convenience, in the FIG. 1 schematic most of the fluid lines are shown as a single line with an arrow showing the normal direction of fluid flow.

In normal operation, the state of affairs shown in FIG. 1 is maintained. When appropriate electrical signals are supplied to the torque motor (not shown) that controls the servo-valve 16, the servo-valve 16 operates in a known fashion to force additional fluid to one side or the other of the actuator piston head 34 and thus cause the actuator rod 32 to move either to the right or to the left with a consequence appropriate adjustment to the navigational element being controlled by the actuator 18. If, however, certain kinds of failures occur which cause a sudden great fluid flow from the servo-valve 16 to the actuator 18, then the limiter device of this invention operates to restrict the actuator rod 32 response to this malfunction.

The kind of malfunction which could result in a sudden flow of fluid from the servo-valve 16 might arise from a number of sources. For example, an electrical failure in the torque motor that adjusts the servo-valve 16 could drive the servo-valve 16 hard over and thus force maximum flow into the actuator 18. Or, contamination in the hydraulic system could plug one of the nozzles of the servo-valve 16 and have the same effect. In any case, it is known that this kind of malfunction can and does occur.

When a malfunction occurs that is the equivalent of driving the servo-valve 16 hard over, then the servo-valve 16 will require a greatly increased fluid flow at its input. This results in an increased fluid flow through the first stage 12 of the limiter. Because of the restrictor 24, increased flow through the first stage 12 results in a drop in the pressure $P_2$, which unbalances the piston head 22 condition shown in FIG. 1 and causes the piston head 22 to move to the right.

Because of the piston rod 42, the piston head 22 is a differential piston in that its right side has an area $A_r$ that is greater than the area $A_s$ of its left side. The smaller area $A_s$ is exposed to the larger pressure $P_1$. But the area $A_s$ is made sufficiently small so that under normal operating conditions the total force $(P_1 A_s)$ on the left side of the piston head 22 is less than the total force $(P_2 A_r)$ on the right side of the piston head 22 and this causes the piston head 22 to remain retracted, as shown in FIG. 1 against the stops 44.

Keeping in mind that this piston head 22 is a differential piston, it can readily be seen that when the pressure drop through the restrictor 24, and thus across the piston head 22, increases, the total force on the right hand side $A_r$ of the piston 22 will decrease. Thus at some first predetermined $P_2$ pressure (for example 860 p.s.i.) the piston 22 will start to move to the right. As it does so, the hydraulic fluid in the chamber 20 will be forced into the line 46 so as to maintain the pressure $P_2$ at the predetermined 860 p.s.i. pressure.

The input pressure $P_1$ is applied through the line 48 to the left side of the spool 28. The first stage 12 output pressure $P_2$ is applied through line 46 to the right side of the spool 28. The spring 26 bias is set so that the spring bias plus the first predetermined $P_2$ pressure will provide a force on the spool 28 that is substantially greater than the force due to the inlet pressure $P_1$. A spring bias of, for example, 400 p.s.i. would perform this function in the example shown. Thus, as long as the pressure $P_2$ is equal to or greater than a second predetermined pressure (in this example, 600 p.s.i.) the spool 28 will not move longitudinally from the position shown in FIG. 1. However, as soon as the piston head 22 has moved as far to the right as it will go in the chamber 20 the full effect of the restrictor 24 will be felt in the line 46 with the result that the pressure $P_2$ will drop below the second predetermined pressure of 600 p.s.i. Once the pressure $P_2$ has dropped below 600 p.s.i., the pressure $P_1$ on the left hand side of the spool 28 will overcome the combined effect of the lowered $P_2$ pressure and the spring 26 to cause the spool 28 to move to the right and thus cause the spool land 28a to overlap the ports 31 leading to the line 38. By means of this land-port arrangement a continuously variable valve is provided in the hydraulic line 38 between the servo-valve 16 and the actuator 18. Partially closing the valve substantially reduces the fluid flow to (or, from, as the case may be) the actuator 18 and thus reduces the rate at which the actuator arm 32 is moved.

The total effect on the actuator arm 32 is illustrated in the FIG. 2 graph. In FIG. 2 the time zero is taken to be the time at which a substantial increased fluid flow through the first stage 12 occurs. Over the portion of the graph labeled $a$, the actuator arm moves at a very fast rate. This $a$ portion of the stroke reflects the accumulator effect of the chamber 20. During this $a$ portion of the stroke, the pressure $P_2$ has not dropped to the point where the spool 28 will move and thus a full maximum flow of fluid from the servo-valve 16 to the actuator 18 is sustained. The point $b$ on the curve indicates the point at which the piston head 22 has completed its movement to its extended position. From the point $b$ on, the line $c$ indicates the actuator displacement with time or actuator rod 32 velocity. The velocity represented by this line $c$ is much less than is the velocity represented by the line $a$ because it represents the situation where the pressure $P_2$ is dropped to the point (600 p.s.i.) where the spool 28 is displaced to restrict the line 38 and thus reduce the rate of fluid flow into the actuator 18.

Figure 5:
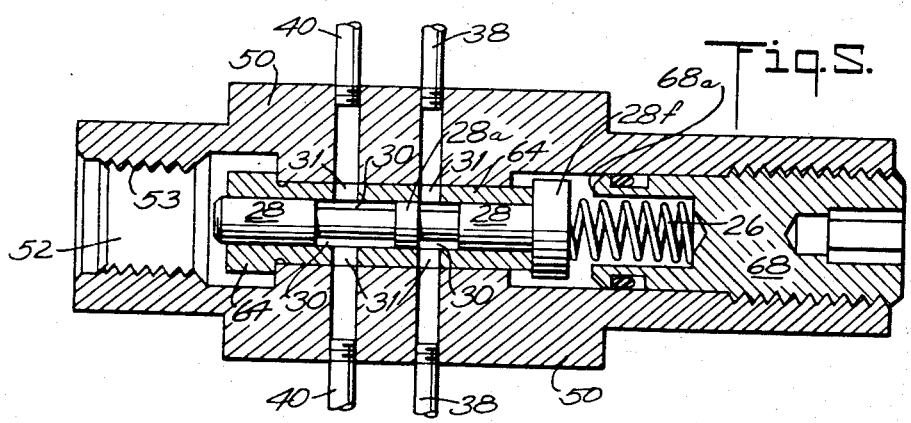
FIG. 5 is a cross-sectional view along the line 5—5 of FIG. 3.

The limiter shown in FIGS. 3, 4 and 5 is one embodiment of this invention. The limiter of FIGS. 3 through 5 is more readily understood with the description of the FIG. 1 schematic arrangement kept in mind. To facilitate comparison of the specific embodiment of FIGS. 3–5 with the FIG. 1 schematic, the same reference numerals will be used as far as possible for comparable parts.

Referring to FIGS. 3–5 the velocity limiter 10 includes a housing body 50 having a longitudinal bore 52 and an upper piston chamber 20 transverse to the bore 52. The bore 52 is provided with an internally threaded section 53 at the left end which threads into the fluid inlet line 48 to direct the flow of fluid at pressure $P_1$ into the bore 52.

The differential piston 22 is slidably mounted in the chamber 20. The restrictor 24 runs through the differential piston 22. A passage 56 places the upstream end of the chamber 20 in communication with the bore 52 and thus applies inlet pressure $P_1$ to the back of the piston 22 and to one end of the restriction 24. A passage 58 places the downstream end of the chamber 20 in communication with the rear portion of the bore 52 to apply fluid at pressure $P_2$ to the right end of the spool 28. In addition, a passage 60 places the rear portion of the bore 52 in communication with the fluid line 46a (see FIG. 1) so as to conduct fluid at pressure $P_2$ to the servo-valve 16. In this fashion, fluid at the inlet passes through the first stage of the velocity limiter 10 by flowing in sequence into the forward portion of the bore 52 and then through the passage 56, the restrictor 24, the chamber 20, the passage 58, into the rear portion of the bore 52, and then through the passage 60, out of the velocity limiter 10. This flow of fluid is shown by a sequence of arrows in FIG. 3.

The upper portion of the piston 22 is conveniently provided with a central recess 70 to abut against the adjustable stop 72. When the differential piston 22 has been brought into operation by the type of failure that causes a very large flow of fluid through the first stage of the device of this invention, the differential piston 22 will be stopped by the stop 72. Adjustment of the position of the stop 72 will serve to adjust the position of the breaking point $b$ in the FIG. 2 graph.

A vent 62 behind the piston rod 42 prevents a vacuum from forming behind the rod 42 when the piston 22 moves up.

In the embodiment illustrated, the restrictor 24 is 0.014 inch in diameter.

The spool 28 is slidably mounted in a fixed sleeve 64 to separate the forward and rear portions of the bore 52. The spool 28 is formed with a pair of spaced peripheral or annular recesses 30 which are sealingly separated from each other by an annular land 28a. The recesses 30 are positioned in alignment with sleeve apertures 31 and lines 38 and 40 so as to conduct the flow of fluid around the spool 28. The recesses 30 are cut so that in the normal state the land 28a is positioned between the lines 38, 40 adjacent the line 38. In the extreme operating position, the annular land 28a moves to the right to partially close the apertures 31 in the line 38 and thus reduce the flow of fluid to the actuator 18.

The spring 26 which bears against the rear portion of the spool 28 is seated in a longitudinally adjustable plug 68. The spring 26 by exerting a 400 p.s.i. force on the spool 28 will cause the spool flange 28f to sit against the edge of the sleeve 64 under normal operating conditions.

Comparing FIGS. 1 and 3, the operation of the velocity limiter 10 is such that when operating under normal conditions, fluid at the inlet line 48 flows into the velocity limiter 10 at a first presure $P_1$, for example 1,000 p.s.i., and after being reduced to a second pressure $P_2$, for example 930 p.s.i., is passed on to the servo-valve 16. In passing through the velocity limiter 10 the fluid is initially introduced into the forward portion of the bore 52 to exert a force on the spool 28 at the pressure $P_1$. Thereafter, the fluid at pressure $P_1$ passes through the restrictor 24 whereby the fluid pressure is reduced to pressure $P_2$ (normally 930 p.s.i.) in the upper chamber 20. At this time, the differential piston 22 is retracted and the chamber 20 volume above the piston 22 is completely filled with fluid at 930 p.s.i. Also, the spool 28 is in a position so that the land is between the fluid lines 38 and 40. The fluid at 930 p.s.i. is then directed through the passage 58 onto the rear portion of the bore 52 to exert a force on the spool 28 at the pressure $P_2$ in opposition to the force exerted on the other end of the spool 28. In addition, the fluid at pressure $P_2$ passes from the rear portion of the bore 52 into the line 46 for passage into the servo-valve 16 at pressure $P_2$.

Since the areas of the ends of the spool 28, exposed to the unequal fluid pressures $P_1$ and $P_2$, are substantially equal, there is an unbalance of forces on the spool 28 which tends to move the spool towards the rear portion of the bore 52. However, the spring 26 applies an additional force of say 400 p.s.i. to hold the spool 28 against the sleeve 64 as shown in FIG. 3.

When the flow demand of the servo-valve 16 increases substantially, the pressure of the fluid out of the limiter 10 and into the servo-valve 16 decreases because of increased drop across the restrictor 24. When the limiter 10 output pressure $P_2$ drops to the first predetermined pressure of 860 p.s.i., the increased differential pressure across the piston 22 causes the piston 22 to move upwardly toward the stop 72. As long as the piston 22 is moving, the first predetermined pressure of 860 p.s.i. is maintained because the increased fluid flow requirement is met by virtue of the stored volume of fluid in the upper chamber 20. This temporarily satisfies the higher flow demand.

After the differential piston 22 abuts against the stop 72 (the condition shown in FIG. 4) the pressure $P_2$ at the rear portion of the bore 52 drops below 860 p.s.i. If the fluid flow demand by the malfunctioning servo-valve 16 is great enough, the drop across the restrictor 24 will increase to the point where the pressure $P_2$ drops to below the second predetermined pressure of 600 p.s.i. At this point the spool 28 moves into the rear portion of the bore 52 to cause the land 28a to restrict the line 38.

The forward edge 68a of the plug 68 limits the rightward movement of the spool 28 by intercepting the flange 28a. Adjustment of the plug 68 therefore permits adjustment of the amount of restriction in the line 38. With reference to FIGURE 2, this adjustment of the plug 68 affects the slope of the line c. For example, the line c' represents a slower actuator rod 32 velocity than does the line c and thus represents a greater restriction in the hydraulic line 38 than is represented by the line c. The amount of lag before this decreased velocity is imposed, is represented by the point b and is affected by the position of the adjustable stop 72. For example, b' represents less time lag than does the point b. Thus point b' represents a lower position for the stop 72 than is represented by the point b.

The invention thus provides a means for limiting the authority of automatic actuators during the occurrence of malfunctions creating increased flow demands in the hydraulic systems of the actuators. Should there be a malfunction which requires an increased flow during flight in an aircraft hydraulic system utilizing the velocity limiter of the invention, the velocity limiter can be used to reduce the velocity authority of the actuator to about 20% of full velocity authority and thus allowing the pilot of the aircraft a short period of time, for instance 3 seconds, within which to bring the hydraulic system back into normal condition in order to avert the danger of a crash.

Further, since the velocity limiter permits an initial abrupt change (due to the time lag feature) in the velocity of the actuator piston rod during a malfunction, such an abrupt change alerts the pilot to the malfunction. This is important where an aircraft is operated under a parallel actuation system such as an automatic pilot where malfunctions are not immediately sensed by a pilot since he is not handling the controls of the aircraft. Because of this time lag feature the invention permits a broader use of automatic pilot systems.

It should be noted that the velocity limiter of the invention can be used to completely stop actuator response. The plug 68 can be adjusted in that the land 28a is allowed to completely cover the port 31 to the line 38 and thus block flow into the actuator 18.

The invention thus provides an efficient reliable means to permit full actuator velocity for a limited time and then to subsequently reduce the actuator velocity to any desired lower valve.

Having thus described the invention, it is not intended that it be so limited as changes may be readily made therein without departing from the scope of the invention. Accordingly, it is intended that the subject matter described above and shown in the drawings be interpreted as illustrative and not in a limiting sense.

For example, the hydraulic actuator whose velocity is being controlled need not be of the type shown. It could be a rotary device such as a hydraulically operated motor.

The land-port valving arrangement, though preferable, could be replaced by any continuously variable valve. Even a poppet valve could be used, though it would not have the control sensitivity that the land-port valve has.

What I claim is:

1. A flow control device to control the rate of fluid flow from a servo-value in a hydraulic system when there may be sudden increases in the rate of fluid flow in said system comprising:
   (a) a first stage having an input and an output to provide a first path of fluid flow,
   (b) a differential piston slidably mounted in a chamber between said inlet and said outlet of said first stage, said piston including a restrictor therethrough to permit fluid to flow from the upstream side of said piston to the downstream side of said piston, the upstream side of said piston having a smaller surface than the downstream side of said piston so that the piston is retracted to a normal upstream position within said chamber as long as the pressure drop across said restrictor does not exceed a first predetermined magnitude,
   (c) a second stage having a path of fluid flow therethrough,
   (d) a continuously variable valve in said path of fluid flow in said second stage,
   (e) means responsive to the pressure downstream from said restrictor in said first stage to reduce the opening of said valve in said second stage when said pressure drop across said restrictor exceeds a second predetermined value, said second predetermined value being greater than said first predetermined value,
      whereby sharply increased fluid flow through said first stage will increase the drop across said restrictor to a magnitude greater than said first predetermined magnitude thereby causing said differential piston to move downstream in said chamber and while moving downstream in said chamber to maintain the pressure drop across said restrictor at a magnitude intermediate between said first and said second predetermined magnitudes, and whereby when said piston has moved to its extreme downstream position in said chamber the pressure drop through said restrictor will increase to a magnitude greater than said second predetermined value so that said valve opening in said second stage will decrease thereby decreasing the rate of fluid flow through said second stage.

2. The flow control device of claim 1 wherein said continuously variable valve is a land-port arrangement and wherein an axially movable spool is provided, said land being mounted on said spool, a first end of said spool being in communication with said first stage input, a second end of said spool being in communication with said first stage output, said limiter further including spring bias means at said second end of said spool.

3. A hydraulic flow control device adapted to control the rate of flow of fluid from a servo-value in a hydraulic system comprising:
   (a) a housing having a first path of fluid flow therethrough and a second path of fluid flow therethrough, said second path of fluid flow being adapted to be coupled to the output of a servo-valve, said first path of fluid flow being adapted to be coupled to the main source of fluid input to said servo-valve,
   (b) a differential piston slidably moutned in a chamber in said first path of fluid flow, said piston containing a restrictor therethrough communicating between the upstream and the downstream sides of said piston, the upstream surface of said piston having a smaller area than the downstream side of said piston, whereby under normal fluid flow conditions through said first path and through said restrictor in said piston, said piston is normally retracted to an upstream position within said chamber,
   (c) a continuously variable valve in said second path of fluid flow, and
   (d) means responsive to the pressure on the downstream side of said restrictor in said piston to determine the opening of said valve as a function of said pressure, whereby fluid flow through said first path of said housing that is substantially greater than said normal flow conditions will cause an increased drop in pressure across said restrictor and a consequent drop in pressure on the downstream side of said restrictor in said piston to cause said piston to move downstream in said chamber thereby tending to maintain the pressure downstream of said restrictor as long as said piston is moving in said chamber, and whereby the pressure downstream of said restrictor in said piston drops substantially when said piston has moved to its extreme downstream position in said chamber with the result that said means responds to said drop in said downstream pressure to modify the opening of said valve thereby affecting the magnitude of flow through said second path of fluid flow in said housing.

4. The flow control device of claim 3 wherein said continuously variable valve is a land-port arrangement and wherein an axially movable spool is provided, said land being mounted on said spool, a first end of said spool being in communication with the input of said first path of fluid flow, a second end of said spool being in communication with the output of said first path of fluid flow, said limiter further icluding spring bias means at said second end of said spool.

5. In a two stage valving device wherein the opening of a valve in the second stage is a function of the pressure at the output of the first stage of the device, the improvement of a time delay in the response of the second stage valve to a drop in pressure in the first stage comprising:
 (a) a chamber in said first stage,
 (b) a piston slidably mounted in said chamber in sealing relationship to the side walls of said chamber, said piston having a restrictor therethrough, whereby all fluid flowing through said first stage must pass through said restrictor.

References Cited

UNITED STATES PATENTS 3,159,178 12/1964 Adams _____ 137—501
3,348,805 10/1967 Wapner _____ 137—501 X ROBERT W. MICHELL, *Primary Examiner.*

U.S. Cl. X.R.
91—446; 210—90